United States Patent [19]

Kuchta et al.

[11] Patent Number: 4,922,829
[45] Date of Patent: May 8, 1990

[54] VARIABLE HEIGHT WORKSTATION AND SYSTEM

[75] Inventors: Richard Kuchta, Tolland; Larry Billings, Manchester; Vladimir Evenzon, Vernon, all of Conn.

[73] Assignee: Gerber Garment Technology, Inc., Tolland, Conn.

[21] Appl. No.: 400,290

[22] Filed: Aug. 29, 1989

[51] Int. Cl.$^5$ .............................................. B61B 3/00
[52] U.S. Cl. ................................ 104/127; 104/128; 104/129
[58] Field of Search ............... 104/127, 128, 129, 130, 104/249; 187/8.41, 8.61, 9 E, 17; 414/222; 198/346.1, 465.4

[56] References Cited

U.S. PATENT DOCUMENTS

| | | | |
|---|---|---|---|
| 2,075,209 | 3/1937 | Kuebler | 104/128 |
| 2,511,316 | 6/1950 | Cody. | |
| 2,956,514 | 10/1960 | Bishop | 104/128 |
| 3,055,311 | 9/1962 | Sgriccia et al. | |
| 4,019,605 | 4/1977 | Kropf. | |
| 4,706,782 | 11/1987 | Spoeler et al. | |

FOREIGN PATENT DOCUMENTS 581227 1/1962 Italy.
195371 4/1967 U.S.S.R.

Primary Examiner—Andres Kashnikow
Assistant Examiner—M. Cunningham
Attorney, Agent, or Firm—McCormick, Paulding & Huber

[57] ABSTRACT

A variable height workstation includes a trolley delivery apparatus for moving a rail section from a gap formed in a subsidiary loop rail to a workstation located remotely from the loop. A pivotal cam moves with the rail section and arrests travel of a trolley on the movable rail section so that rail section may be moved toward the workstation while carrying the trolley. As the rail section moves upwardly toward the gap formed in the subsidiary loop, the cam rotates and accelerates the trolley off the rail section. The trolley delivery apparatus is employed in a subsidiary loop system whereby a first escapement device is located upstream of it to advance selected one of the diverted trolleys onto the moveable rail section. The pivotal cam associated with the moveable rail section in turn advances the involved trolley off the rail section downwardly on a downstream rail portion toward a second escapement device whereupon trolleys may again collect and are subsequently advanced at intervals onto a transfer slide for carriage into an elevator upwards toward the main rail of the system.

23 Claims, 7 Drawing Sheets

VARIABLE HEIGHT WORKSTATION AND SYSTEM

CROSS REFERENCE TO RELATED APPLICATION

The present application relates to U.S. Pat. No. 4,840,123 filed on Oct. 29, 1987 in the name of Harold L. Osthus et al. entitled CONVEYORIZED APPARATUS WITH MOVEABLE RAIL SECTION being commonly assigned with the assignee of the present invention.

BACKGROUND OF THE INVENTION

The present invention resides in a conveyorized transport apparatus having a rail system for transporting articles carried by a trolley between one location and another and, more particularly relates to a variable height workstation capable of delivering a trolley from a first location on a subsidiary loop rail to a second diverted location adjacent a workstation.

A conveyorized transport system used for transporting workpieces between a series of subsidiary loops located adjacent individual workstations is disclosed in U.S. Pat. No. 4,615,273 issued on Oct. 7, 1986 and commonly assigned with the assignee of the present invention. Systems of this type usually involve a series of workers situated at workstations on either side or on both sides of the main rail. Individual ones of the trolleys are optically scanned and then, according to a predetermined program employed by a master computer or controller, diverted toward a selected one of the workstations located along the main rail. Each operator or worker associated with a particular workstation is charged with a given function to perform on the workpiece carried by the diverted trolley when it arrives at the associated workstation. These workers may repeat the same work function several hundred times over the course of a workday in performance of that work function. The trolleys travelling on the main rail are diverted from the main rail system onto subsidiary loops and are usually stopped on these subsidiary loops by gates where work material carried by respective ones of the trolleys await performance of work a function by an operator situated at the workstation.

The problem associated with these gates is that often they are situated along the subsidiary loop rail such that a stopped trolley and the workpiece carried by it are suspended on a portion of the subsidiary loop at a considerable distance above and away from the operator. Consequently, the operator usually must reach across this distance from a position adjacent his or her workstation to attempt to grasp the workpiece carried by the involved trolley which has stopped at the gate. Such extended grasping movements tend to exhaust the operator during the course of the workday thus robbing him or her of valuable time and energy which otherwise could be applied toward the work function at hand. Thus, a clear need for an ergonomically efficient workstation is apparent in order to situate workpieces adjacent a perspective worker so as to minimize the total number of movements required of the worker or operator in performance of a particular work function and thereby maximizing efficiency of productivity.

Other devices have been developed which address this problem. One such type of device is disclosed in the aforesaid U.S. Pat. No. 4,840,123. In this patent, a rail of a subsidiary loop is positioned adjacent a workstation and is capable of pivotal movement through two orthogonally oriented planes so as to position a trolley, carried at the free swinging end of the rail segment, adjacent a workstation. While such a device has been successful in increasing the ergonomic capability of the worker at a given workstation, it is however sometimes desirable to deliver a trolley carrying a workpiece to a workstation without having to swing a rail segment through any angular movement. Also, it has been found that significant mechanical means are needed to effect pivotal movement of the arm in this patent requiring both a complex control system and a variety of multifaceted moving parts.

Accordingly, it is an object of the present invention to provide a workstation capable of delivering trolleys from a subsidiary loop conveyorized transport apparatus to a workstation such that an operator performing a work function on a workpiece carried by a diverted trolley traveling on the subsidiary loop rail accomplishes this task with maximum ergonomic ease for a given individual.

Still a further object of the present invention is to provide a workstation scheme capable of efficiently managing the transportation of diverted trolleys from the main rail to a workstation by way of a subsidiary loop and back onto the main rail with a minimal amount of lag time by collecting the diverted trolleys at points along the subsidiary loop closest to the next destination to which they are to be advanced.

SUMMARY OF THE INVENTION

The present invention resides in a variable height workstation used in a subsidiary loop of a conveyorized transport system employing a trolley delivery apparatus having a moveable rail section located within a gap formed in the subsidiary loop rail and being moveable between an upper position where the moveable rail section bridges the gap in the subsidiary loop and a lower diverted position adjacent a workstation. Engagement means are located adjacent the moveable rail section and are employed for automatically arresting the travel of a trolley on the moveable rail section once the rail section moves away from its bridging position and for automatically accelerating the trolley off the rail section as the rail section returns to its bridging position. The moveable rail section and the engagement means are fixedly secured to a vertical actuator for unitary movement between the upper and lower positions.

The invention also resides in a system for managing the transportation of trolleys between the main rail and the subsidiary loop such that the trolleys spend a minimum of time in transportation between stationary locations. This accomplished by continuously positioning the trolleys along the subsidiary loop for movement to a next destination at a position closest to such destination. To this end, a first escapement device is positioned above an upstream portion of the subsidiary loop to accelerate an individual trolley toward the trolley delivery apparatus and the adjacently disposed workstation. At this point, the involved one of the diverted trolleys may be lowered toward the workstation so that the garment piece carried by this trolley is located adjacent a workstation operator. As the rail section is moved back into its bridging position, the engagement means then accelerates the trolley off the rail section downwardly toward a third escapement mechanism positioned at the lower end of the subsidiary loop adjacent an elevator. These trolleys which have been moved through the delivery apparatus collect upstream of the third escapement device and are subsequently advanced onto a transfer slide and into an elevator for movement upward to the main rail.

DETAILED DESCRIPTION OF THE PREFERRED EMBODIMENT

Figure 1:
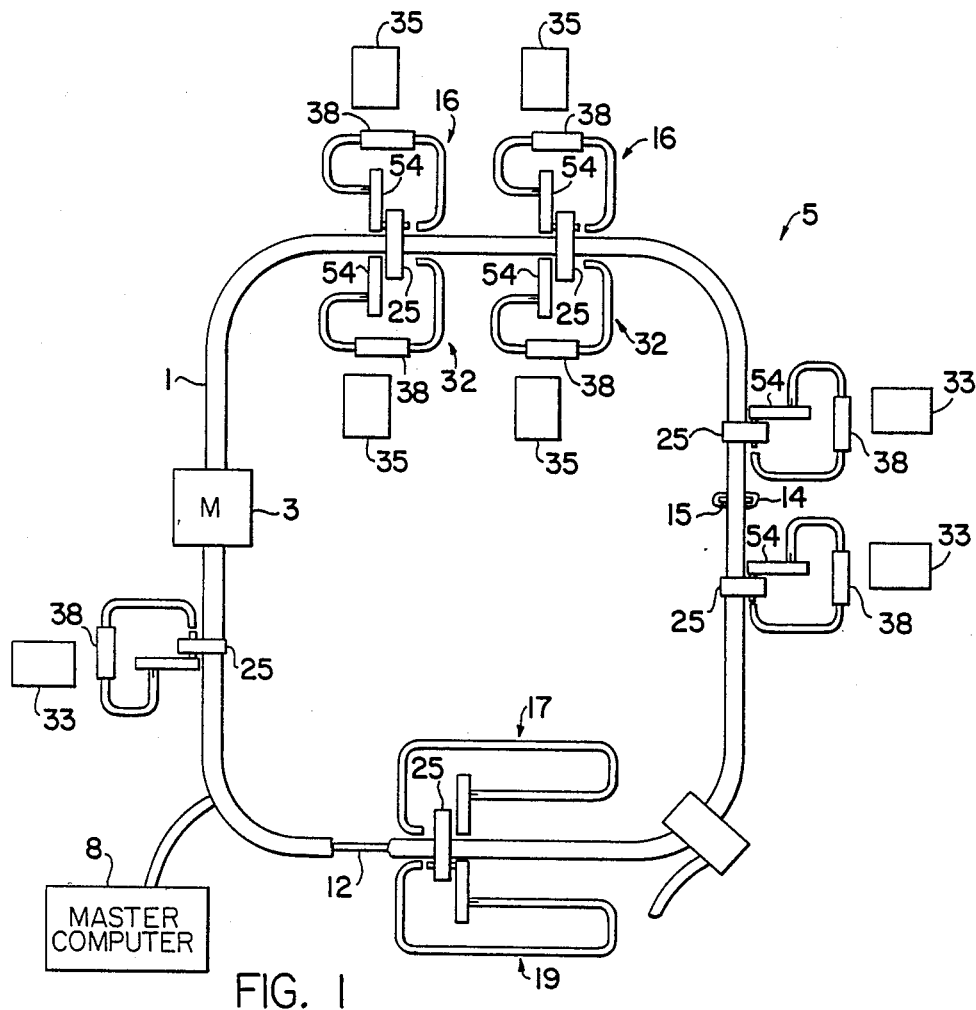
FIG. 1 is a top view of an automated transport system capable of employing the variable height workstation embodying the present invention.

Turning first to FIG. 1, an automated transport system shown generally as 5 employs the invention. The system includes a propulsion track 1 in the form of an extruded channel through which an endless chain having pushers 15,15 travels under power from a motorized drive unit 3. Situated beneath the track 1 is a main rail 12 along which freely traveling trolleys 14,14 ride while being propelled by the pushers 15,15. Positioned along the track along either or along both sides, such as in pairs, are subsidiary loops, 16,16 and 32,32 leading to and from a workstation 33,35 and subsidiary loops 17 and 19 leading to storage facilities from the track 1. The automated transport system 5 further includes a master computer 8 for controlling the movements of three position switches 25,25 which route the trolleys between the main rail 12 and each pair of subsidiary loops 32,32 and 16,16 or directly between adjacently disposed subsidiary loop pairs 32,16 and 32,16. The subsidiary loops 32 and 16 either individually or in pairs, and the associated one of the workstations 33 and 35 may include a variable height workstation embodying the present invention shown schematically as reference numeral 38 in FIG. 1.

Figure 2:
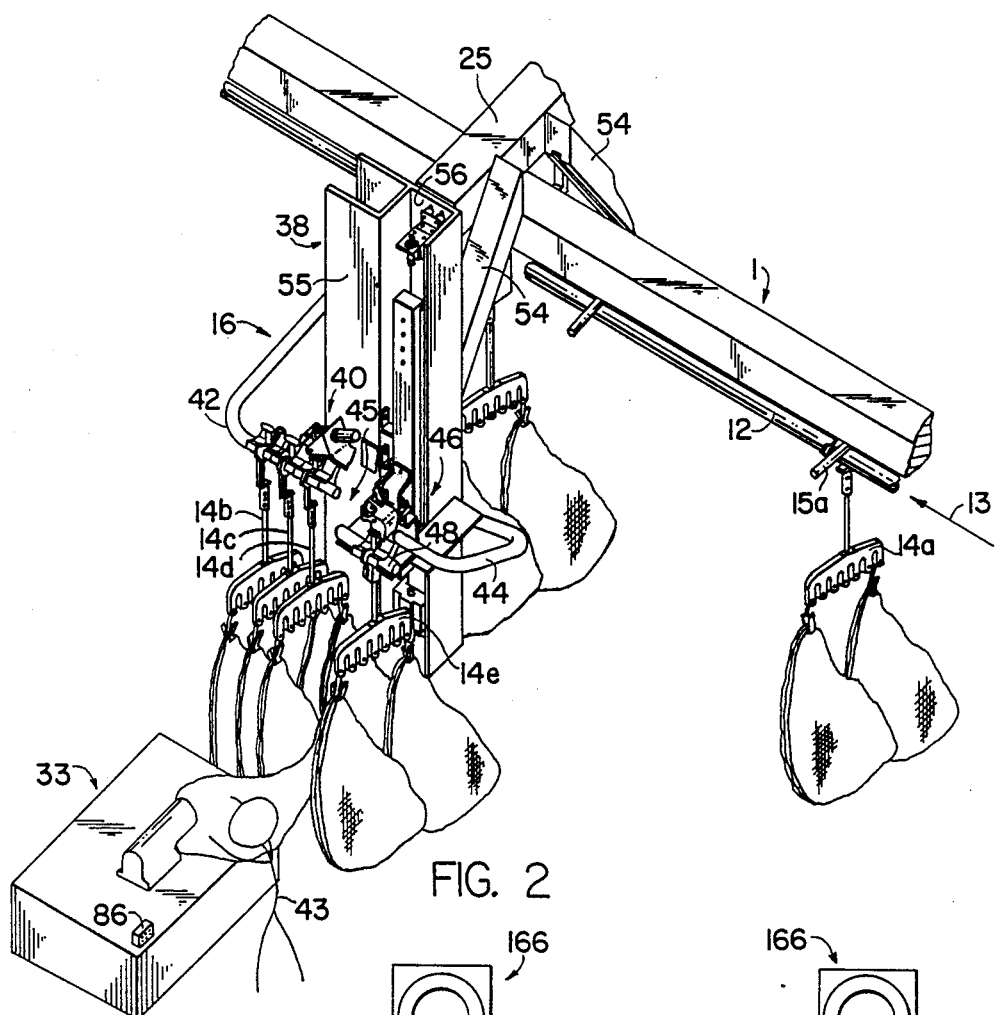
FIG. 2 is a perspective view of a portion of the subsidiary loop of the automated transport system of FIG. 1 illustrating the variable height workstation embodying the present invention.

Referring now to FIG. 2, a section of the automated transport system 5 of FIG. 1 is shown and illustrates the variable height workstation 38 situated generally midway along the subsidiary loop 16 with the rail defining the loop 16 being formed from pipe bent or cast to curve into a position adjacent the workstation 33. As shown, a trolley 14a rides on the main rail 12 and is propelled in the illustrated direction 13 by one of the pushers 15 specifically identified as 15a. A series of restricting brackets (not shown) extend downwardly from and are driven by the endless chain traveling along the track 1 and are positioned in front of each of the pushers 15,15 such that the trolley 14a as shown in FIG. 2 is moved toward the subsidiary loop 16 under the positive force of the pusher 15a. When instructed by the controller 8 to do so, the switch 25 diverts a selected one of the trolleys 14 being moved along the main rail 12 into one of the subsidiary loops 16 or 32. The pipe forming of each of the loops 16 and 32 also slopes downwardly from its entrance free end adjacent the switch 25 so that a trolley rolls along it under gravity toward the variable height workstation 38. For a more complete description of the transferring operation, reference may be had to the above mentioned U.S. Pat. No. 4,615,273 entitled CONVEYORIZED TRANSPORT SYSTEM.

The variable height workstation 38 embodying the present invention is interposed along the loop 16 such as to separate it into an upstream portion 42 and a downstream portion 44. The two portions 42 and 44 of the loop 16 further define a gap 45 adjacent the variable height workstation 38. A moveable rail section 48 is interposed in the gap 45 and is vertically moveable between an upper position where the rail section 48 bridges the gap 45 and a lower position where it is positioned adjacent the workstation 33. The variable height workstation 38 further includes an escapement device 40 positioned upstream of the rail section 48 such that trolleys, shown for example as 14b through 14d, may collect at a position upstream of the moveable rail section 48 along the upper portion 42 of the loop 16. The escapement device 40 may be one such as disclosed in co-pending U S. patent application No. 315,152 Entitled ESCAPEMENT MEANS FOR GRAVITY FED TROLLEYS WITH ACCELERATING CAPABILITY filed on Feb. 24, 1989 being commonly assigned to the assignee the present invention and which disclosure being hereby incorporated by reference.

As will become more readily apparent later, trolley engagement means 46 are employed with the moveable rail section 48 to cause the travel of the trolley, in the case of FIG. 2 illustrated by reference numeral 14e, to be stopped on or advanced from the rail section 48. The operator 43 controls the vertical movement of the rail section 48 by instituting signals generated by a control box 86 connected to the apparatus which moves the section 48 between its upper and lower positions. After a work function is performed and the moveable rail section is returned to its upper bridging position, the engagement means 46 accelerates the involved trolley away from the variable height workstation 38 and onto the downstream rail portion 44 toward an elevator 54. Prior to being received within the elevator 54, the trolleys may again collect upstream of a second escapement device (not shown) positioned adjacent the lower free end of the loop 16 such that individual ones of the trolleys collect at the second escapement device for subsequent individual advancement onto a transfer slide which in turn moves the involved trolley into an elevator car for movement upwardly towards the main rail 12. For a more complete description of the transfer slide operation, reference may be had to U.S. Ser. No. 249,442 entitled TRANSFER SLIDE ASSEMBLY AND SYSTEM filed on Sept. 26, 1988 which application being commonly assigned to the assignee of the present invention and being hereby incorporated by reference.

Figure 3:
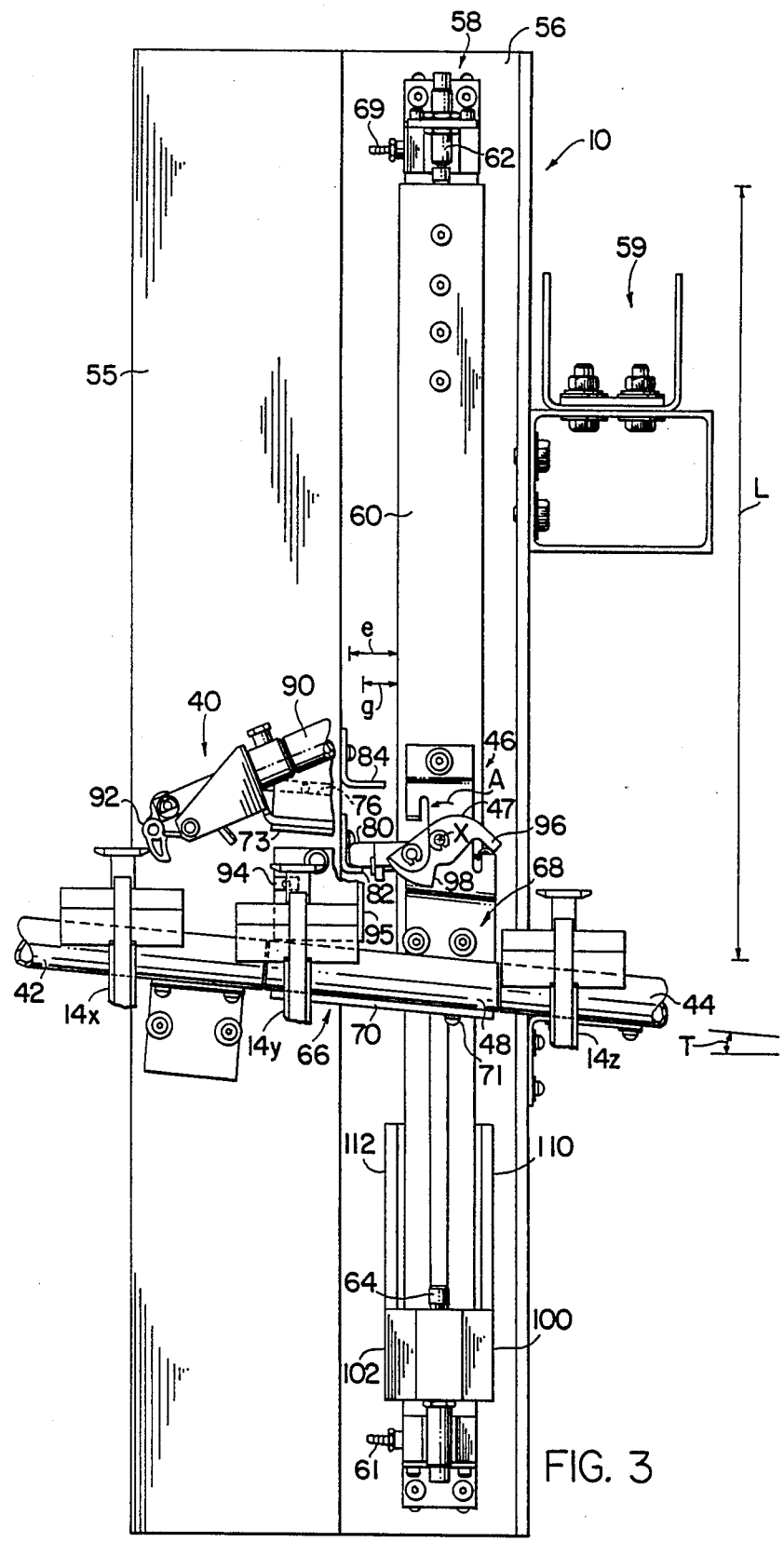
FIG. 3 is a side elevation view of the variable height workstation showing the moveable rail section in its bridging position.
Figure 4:
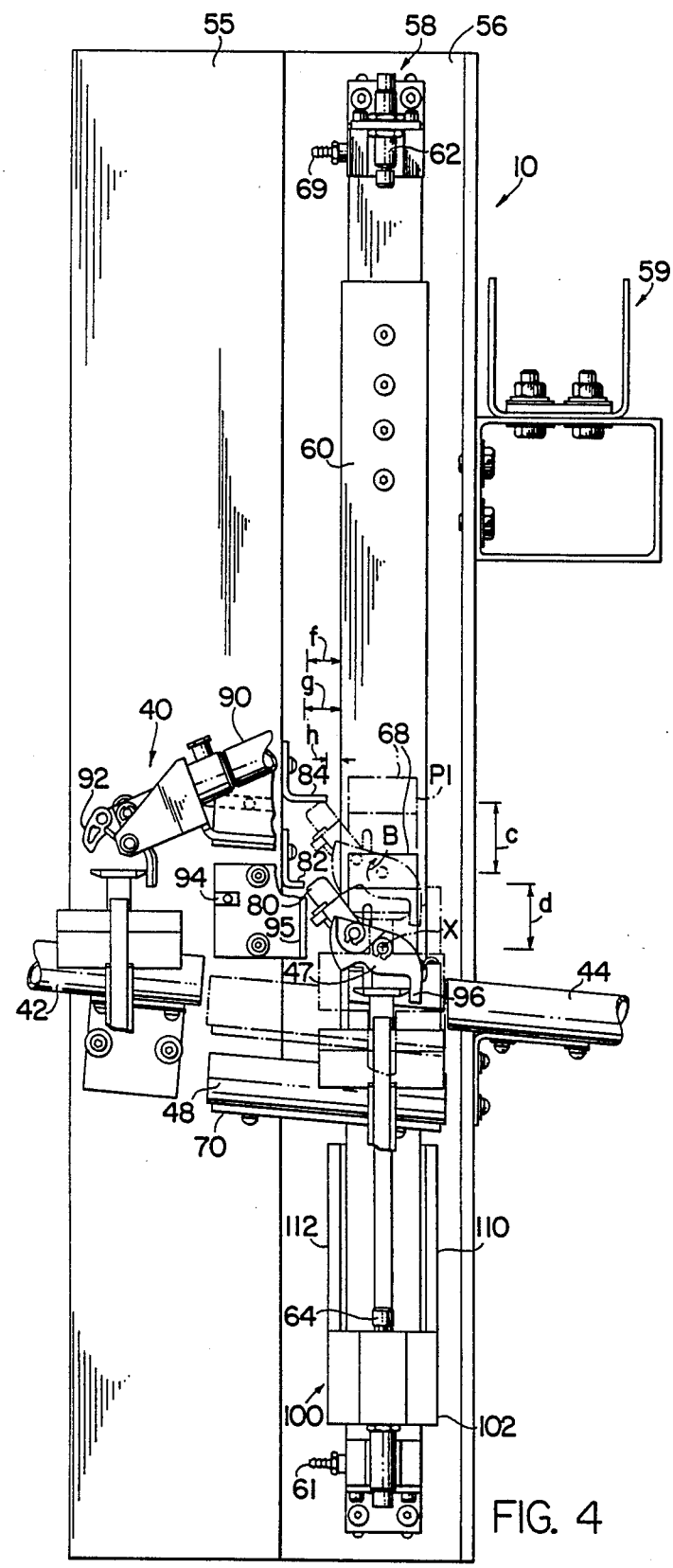
FIG. 4 is a side elevation view showing a trolley carried by the moveable rail section being moved vertically and shows in phantom line the operation of the engagement means.

Referring now to FIGS. 3 and 4 a trolley deliver apparatus shown generally as 10 includes an elongate actuator 58 supported in an inlaid channel 56 which actuator 58 has a vertically movable slide 60 on which the moveable rail section 48 and the trolley engagement means 46 are fixedly supported. The channel 56 may be vertically supported above the workstation 33 on cross-frames members shown generally as elements 59, but may alternatively be supported from below by a floor support. In the preferred embodiment of the invention, the trolley engagement means 46 includes a cam 47 pivotable about axis X and being fixed for movement with the slide 60 so as to travel with the rail section 48 between its upper and lower limits. The pivotal cam 47 has a stop face 96 and a pusher portion 98 each being angularly moveable with the cam 47 such that the cam 47 is oriented in an open or flow-through position as shown in FIG. 3 when the moveable rail section 48 is located in its bridging position. The moveable slide 60 is capable of travelling on the actuator 58 between an uppermost limit where the top end of the slide 60 abuts with an upper stop 62 and a lowermost limit where a depending end of the slide 60 abuts a lowermost stop 64.

A generally L-shaped supporting bracket 66 fixes the movable rail section 48 and the trolley engagement means 46 to the slide 60. The bracket 66 has a first, generally vertically oriented portion 68 which is secured to the moveable slide 60 by suitable fastening means such as screws or other like fasteners and includes a second lower portion 70 extending laterally from the first portion 68 such that the rail section 48 is fixedly supported on the second portion 70 of the bracket 66 by suitable fastening means, such as by screws 71. The second portion 70 of the L-shaped bracket 66 is also inclined at an angle T relative to the vertical portion 68. This inclination enables the rail section 48 to bridge the gap 45 so as to create a continuous surface upon which a trolley may travel from the upstream section 42 and onto the downstream section 44. It is necessary that the moveable rail section 48 be disposed at the indicated inclination T since both confronting ends of the adjoining upstream and downstream rail sections 42 and 44 are fixed to the trolley delivery apparatus 10 at the angle T to maintain the downward slope along this region of the subsidiary loop 16. In order to insure consistent vertical positioning of the rail section 48 with each of the upstream and the downstream rail portions 42 and 44 respectively, the length L of the slide 60 is sized such that when the actuator 58 is energized to position the slide 60 at its uppermost position against the upper stop 62, the rail section 48 automatically becomes aligned with the oppositely facing ends of the portions 42 and 44 of the rail 16.

The upstream escapement device 40 may be adjustably supported by a generally angular bracket 73 having a vertically extending portion bearing on an outwardly disposed flat flange 55 extending from the channel 56. Formed integrally with the vertical portion of the bracket 73 is an inwardly protruding threaded bolt which is capable of being received within a slot 76 formed in the flange 55 and engaged by a locking nut such that the escapement device 40 may be adjusted along a section of the upstream portion 42 of the subsidiary loop 16 if desired.

In order to regulate the travel of a given one of the trolleys 14 onto and off of the moveable rail section 48 and to synchronize such regulated movements with the vertical movements of the rail section 48, an over-the-center spring mechanism is employed having a lever 80 cooperating with two vertically spaced apart abutments 82 and 84 disposed on one sidewall of the channel 56. As will be explained later in greater detail, the lever 80 is normally biased in either a clockwise or counterclockwise direction with the lever 80 being rotatably connected for unitary movement with the cam 47. The lower abutment 82 serves to arrest rotation of the lever 80 in the indicated A counterclockwise rotational direction when the rail section 48 is located in its bridging position shown in FIG. 3. Conversely when the lever 80 is biased in the opposite indicated B rotational direction, shown in FIG. 4, the lever 80 is maintained at a generally ten o'clock position by rotational limit means carried by the vertical bracket portion 68 as will be hereinafter discussed.

To accomplish synchronized coaction with the abutments 82 and 84, the length of the lever 80 is sized such that when the cam 47 is in its open or flow-through position a shown in FIG. 3, the lever 80 extends laterally of the slide 60 spaced by a distance represented by dimension e in FIG. 3. However, the lever 80, when in its raised position shown in FIG. 4, extends laterally of the slide 60 at a distance indicated by dimension f which dimension being less than that of the dimension e. Since the lower abutment 82 creates a clearance indicated as dimension g in FIG. 3 which is less than the dimension e but greater than the dimension f, the lever 80 therefore strikes the lower abutment 82 when the rail section 48 is moved downwardly thereby urging it in the indicated B direction. Upon continued downward movement of the rail section 48 by the actuator 58, the lever 80 moves to its raised position and thus passes freely and unobstructively past the lower abutment 82. Thus, it should be appreciated that the cam 47 is automatically moved to its locking position simultaneously with the downward moving of the rail section 48 from its bridging position, such that as the involved one of the trolleys 14, in this case indicated as 14y, travels along the rail section 48 toward its downstream end, the trolley is prevented from rolling off the segment by the stop face 96 of the cam 47 which is rotated into the blocking position shown in FIG. 4 prior to the arrival of the trolley 14y at the downstream end of the rail section 48.

In further accordance with the invention, the pusher portion 98 of the cam 47 is capable of accelerating a trolley from a stopped position on the rail section 48, onto the downstream portion 44 of the subsidiary loop 16 once the rail section 48 is moved back into its bridging position. As is apparent from FIG. 4, the upper extent of the lever 80 when oriented in its raised free-standing position stands at a height indicated as d above the axis of rotation X of the cam 47. The phantom line position P1 of the upper bracket portion 68 illustrates the uppermost limit of travel of the rail section 48 coincident with slide 60 being moved into abutment with the upper stop 62. At the indicated P1 position, the distance between the lower surface of the abutment 84 and the axis of rotation X of the cam 47, identified as dimension c, is somewhat smaller than the free standing height indicated as dimension d of the lever 80. In addition, the upper abutment 84 extends laterally of the slide 60 so as to create a clearance therebetween equal to the indicated dimension h. Also, since the lever 80 in its raised position extends laterally of the slide 60 at a distance corresponding to the indicated dimension f which dimension being greater than the clearance h, and since the dimension c is smaller in size than that of dimension d, the lever 80 contacts with and is urged downwardly in the indicated rotational direction A as the slide 60 approaches and contacts the upper stop 62. That is, as the slide 60 is moved upwardly toward the upper stop 62 by the vertical actuator 58, the upper surface of the lever 80 contacts with the lower surface of the abutment 84. As the slide 60 continues to move upwardly, the continued movement reverses the bias of the spring in the over-the-center mechanism such that it acts to create an opposite rotational directional force to rotate the ca 47 and the pusher portion 98 in the indicated A direction. The particular details of the over-the-center mechanism will be discussed in greater detail with reference to FIGS. 6 and 7, but for the moment the basic biasing functioning of the over-the-center mechanism which governs the movement of the cam 47 should be appreciated.

As discussed previously, movement of the lever 80 in the indicated A rotational direction is subsequently arrested by the lower abutment 82. But, before the lever 80 engages with the abutment 82, the pusher portion 98 of the cam 47 rotates into engagement with the trolley situated on the moveable rail 48, in this case shown as 14z in FIG. 3, to contact with it and force it off the rail section 48 under acceleration. As such, it should be appreciated that the cam 47 not only serves as a stop preventing the involved trolley from rolling off the lower end of the moveable rail section 48 when it is being lowered from its bridging position to a position adjacent a workstation, but also that the cam 47 additionally provides a means by which the trolley is automatically accelerated off the rail section 48 after it is raised to its bridging position.

One of the features of the present invention is the relative compactness of the delivery apparatus 10 as well as its being smoothly operable in moving the rail section 48 between its upper and lower limits. To this end, the actuator 58 is preferably a duel acting pneumatic actuator of the type known as a BAND CYLINDER having an upper inlet 69 and a lower inlet 61 allowing pressurized fluid, usually compressed air to be introduced into the actuator 58 at selectively different instances. The upper and lower stops 62 and 64 being located intermediate the distal ends of the actuator housing serve also to preserve the actuator 58 from wear by absorbing the impact of the moving slide 60 rather than allowing the coupled internally sliding piston in the actuator 58 to impact on the actuator distal ends. In addition, each of the stops 62 and 64 are impact absorbing shock-absorber type elements utilizing hydraulic fluid and a coiled spring for gradually arresting the linear motion of the slide 60 as it impacts on the associated stop.

The variable height workstation 38 operates such that the trolley delivery apparatus 10 is usually involved with a series or a single diverted trolley collecting upstream of the escapement device 40 as indicated by the trolley 14x in FIG. 3. As discussed previously, the operator 43 generates a command to begin advancing the first one of the collected trolleys 14x by pushing a button on the control box 86 located adjacent the workstation 33. In so doing, a pneumatic actuator 90 of the escapement device 40 responds by rotating a bell crank 92 and accelerating the closest one of the collecting trolleys, in this case labelled 14y, toward the delivery apparatus 10 such that the trolley 14y travels from the upstream rail section 42 and onto the moveable rail section 48 located in its bridging position. As the trolley 14y is accelerated onto the rail section 48, a sensor 94 located adjacent the upstream end of the rail section 48 is activated and subsequently issues a signal to activate a solenoid switch associated with a pressurized fluid line connected to inlet 69 to introduce pressurized fluid into the upper inlet 69 of the vertical actuator 58 thereby moving the slide 60 downwardly toward the lower stop 64. In so doing, the lever 80 rotates the cam 47 in the indicated 8 rotational direction to position the stop face 96 in its blocking position above the rail section 48 in the manner as has been previously discussed.

As the rail section 48 carrying the trolley 14y and its accompanying workpiece are lowered toward the operator 43, the horizontally extending lower portion 70 of the L-shaped bracket 66 eventually engages the lower stop 64 and consequently seats at that point. Once the rail section 48 engages the lower stop 64, the operator 43 can thus perform the designated work function on the workpiece carried by its trolley by simply grasping laterally outwardly of the adjacently disposed workstation 33 to access the workpiece. After the work function is performed, the operator again institutes a command via the control box 86 sending another signal which closes the solenoid associated with the upper inlet 69 and subsequently activates another fluid solenoid switch associated with a pressurized fluid line connected to lower inlet 61 allowing pressurized fluid to pass into the lower inlet 61 thereby moving the slide 60 upwardly toward the upper stop 62 and to position the rail section 48 in its bridging position.

Figure 5:
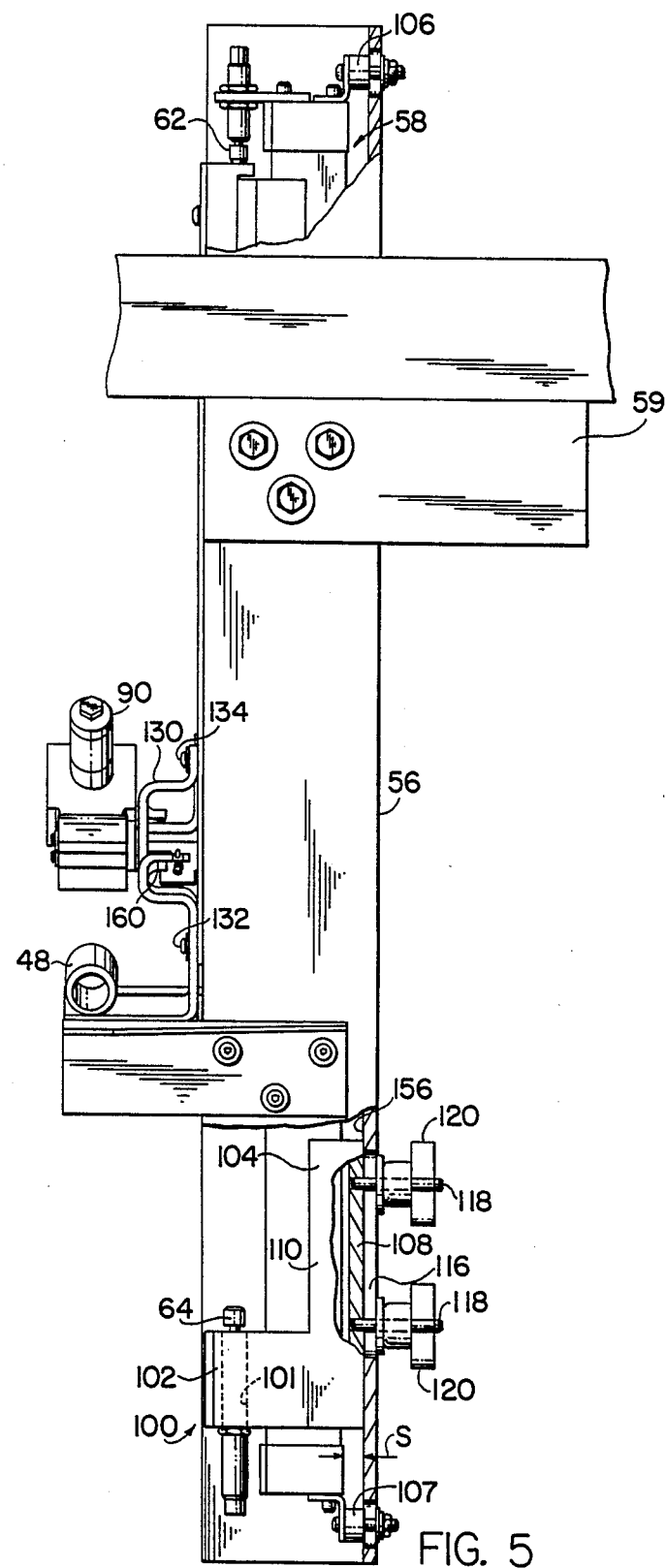
FIG. 5 is a partially fragmented front elevation view taken downstream of the variable height workstation showing the moveable rail section in a bridging position along with the adjustable lower stop structure.

Referring now to FIG. 5 and in part to FIG. 4, means for adjusting the position of the lowermost stop 64 are illustrated in the cut away view of the channel 56 in FIG. 5. The lower stop 64 is fixed within a stop cradle 100 having a generally horizontally extending portion 102 and a vertically extending portion 104. A through threaded bore 101 is formed in the horizontally extending portion 102 and is sized to receive the cylindrically shaped and externally threaded housing of the stop 64. The vertically extending portion 104 of the cradle 100 has in horizontal cross-section a generally U-shape defined by a backwall 108 and two juxtaposed sidewalls 110 and 112 which are bridged outwardly of the backwall 108 with one another by the horizontally extending portion 102 thereby forming the cradle 100. Spacers 106 and 107 cooperating with anchor bolts extending from the actuator 58 fix the actuator 58 in a spatial relationship with the inner backwall 156 of the channel 56. As such, a spacing S is created between the actuator 58 and the wall 156 such that the thickness of the rear wall 108 of the cradle 100 is capable of freely sliding between the two juxtaposed surfaces of actuator 58 and the wall 156. A vertically extending slot 116 is formed in the wall 156 of the channel 56 such that at least one threaded shank 118 fixed to and extending outwardly from the rear wall 108 of the cradle 100 passes through the slot 116 so as to be exposed outwardly of the channel 54 for ready engagement with lock nuts 120. As such, an operator desiring to either lower or heighten the position at which the rail section 48 carrying the involved trolley stops relative to the workstation 38, may loosen the lock nuts 120 and proceed to either raise or lower the position of the cradle 100 according to the individual needs of the particular operator.

Figure 6:
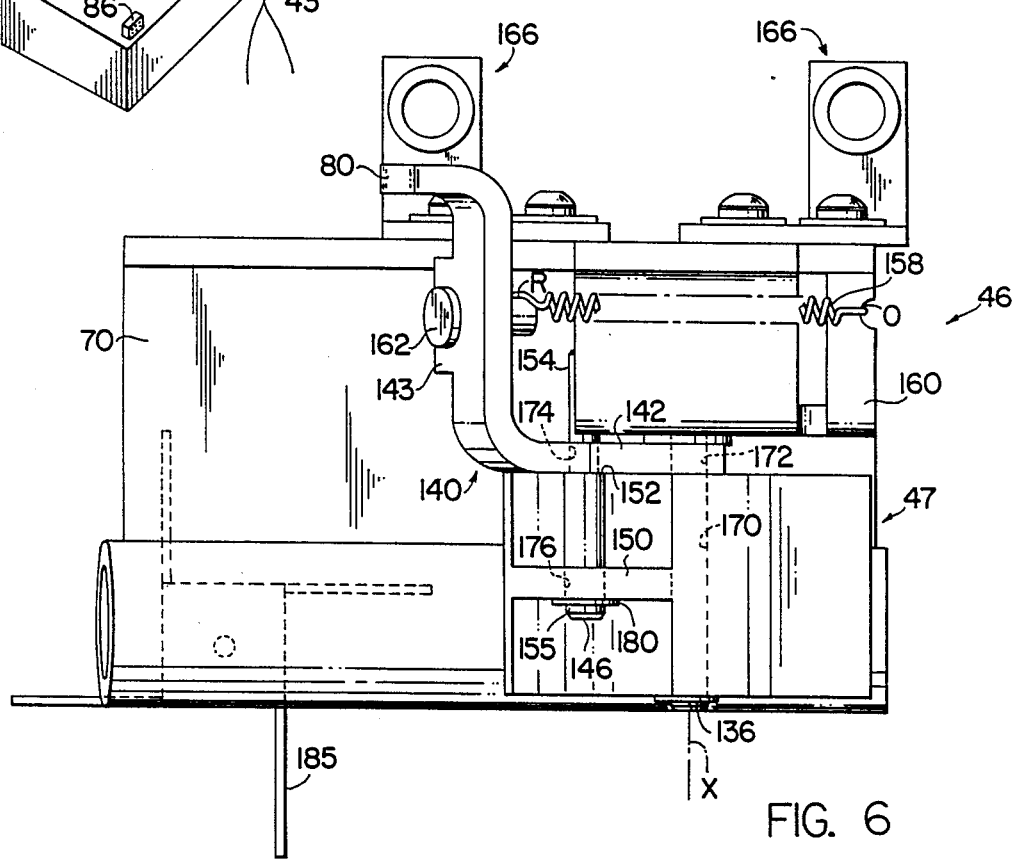
FIG. 6 is a top view of the moveable rail section and the trolley engagement means shown separately from the variable height workstation.
Figure 7:
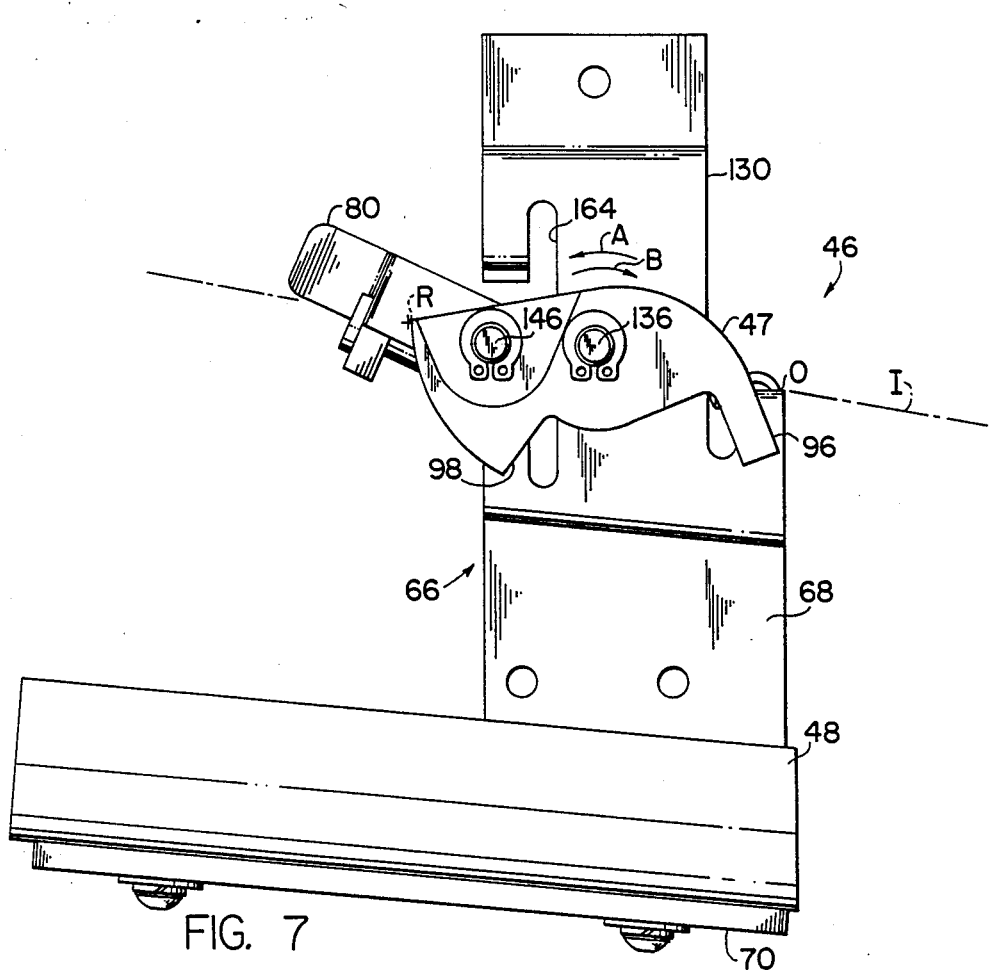
FIG. 7 is a side elevation view of the moveable rail section and the trolley engagement means shown separately from the variable height workstation.

Referring now to FIGS. 6 and 7, and in part to FIG. 5, the over-the-center mechanism employed for operating the cam 47 between a flow-through and a blocking position is shown in detail. A generally hat-shaped bracket 130, shown as such in sideview in FIG. 5, is formed along the vertically disposed portion 68 of the L-shaped bracket 66 and is mounted on the slide 60 at securing points 132 and 134. A pivot pin 136 is fixed to and extends outwardly laterally of the outermost region of the hat-shaped bracket 130 coincident with the axis X such that the cam 47 rotatably receives the pin 136 in a through bore 170 for rotation in either of the indicated A or B rotational directions above the rail section 48. As shown in FIG. 6, a generally Z-shaped element 140 formed in part by the lever 80 further comprises a mounting element 142 extending generally parallel with the lever 80 and is connected to it by a transversely extending portion 143. The mounting element 142 of the Z-shaped bracket 140 also has a through opening 172 aligned with the similarly sized through opening 170 formed in the cam 47 such that the Z-shaped bracket 140 and the cam 47 are capable of rotating in unison about the pivot pin 136 in either of the indicated A or B rotational directions.

In order to rotatably couple the Z-shaped bracket 140 with the cam 47, a rotational coupling pin 146 joins each of these members with one another. The pin 146 is received within differently sized openings 174 and 176 formed respectively in the mounting element 142 and in a web 150 of the cam 47. The coupling pin 146 is stepped at 152 such that the diameter of the pin 146 is greater in size at the end portion 155 relative to the other end portion 154. As such, the intermediate stepped portion 152 confronts the mounting element 142 of the Z-shaped element 140 and cooperates with an annular groove formed about the end 155 of the pin 146 which receives a snap ring 180 thereby retaining the pin 146 from axial movement.

The cam 47 is biased to its flow-through position and to its blocking position by a tension spring 158 cooperating with the rotatably mounted Z-shaped element 140 to bias it and consequently the cam 47, between these two positions. To this end, a part of the hat-shaped element 130 as best shown in FIG. 5 is turned toward the base of the hat shape to create a mounting arm 160 such that one end of the spring 158 may be hooked at a fixed point 0 on the arm 160. The opposite end of the spring 158 is in turn attached to the transverse portion 143 of the Z-shaped bracket 140 via a retaining pin 162 received through an opening in the transverse portion 143 which pin 162 retaining the opposite end of the spring 158 at a moveable point R relative to the fixed point O. To achieve over-the-center action, the spring 158 is capable of passing through an imaginary plane 1 extending through the fixed point O. The plane 1, as shown in FIG. 7, defines the over-the-center position where the spring 158 is extended at its maximum elongation. It is at this point where slight upward or downward urging generated by the slide 60 causes the lever 80 to cooperate with the upper abutment 84 or lower abutment 82 to rotate the lever 80 through the plane I and thereafter effect a reverse biased of the cam 47 in an opposite rotational direction.

A portion of the hat-shaped bracket 130 is cut away at 164 to allow the inwardly directed end 154 of the coupling pin 146 to rotate in the indicated B-direction laterally inwardly of the hat-shaped bracket 130. The cut away 164 however does arrest rotational movement of the pin 164 in this direction to hold the lever 80 in the freestanding raised position shown in FIG. 4. It is thus apparent that the coupling pin 146 not only rotatably couples the cam 47 with the lever 80, but also serves as a stop which limits the rotation of the lever 80 in the indicated B-direction once the rail section 48 begins its downward movement from its bridging position.

Returning to FIG. 6, it may be preferable to include as part of the L-shaped bracket 66 centering means for ensuring the proper positioning of the rail segment 48 when it is moved into its bridging position. For this purpose centering rings 166 may extend inwardly of the bracket 70 and cooperate with correspondingly sized centering pins (not shown) supported on, for example bracket 95 shown in FIG. 4. Also, it may be desirable to employ a one-way turnstile 185 rotatably fixed to the bottom of the second, generally laterally extending portion 70 of the bracket 66 to insure that the involved trolley entering onto the moveable rail 48 is restricted from inadvertently moving upstream once it travels onto the rail section 48.

In summary, the variable height workstation 38 of the present invention provides increased efficiency in the transportation of trolleys from the main rail through a subsidiary loop where performance or a designated work function is to be accomplished on a workpiece carried by an involved trolley from which point the trolley is to be moved back onto the main rail system. This increased efficiency in travel time is accomplished to a large degree by the trolley delivery apparatus 10. The engagement means 46 being synchronized with the vertical movements of the moveable rail 48 both automatically stops and accelerates a trolley on the moveable rail section 48 without loss of motion. The system employed by the variable height workstation 38 of the present invention further may include providing a second escapement device located adjacent the lower end of the downstream rail portion 44 of the subsidiary loop 16 such that trolleys may collect at this point and subsequently be accelerated onto a transfer slide for carriage onto an elevator car for movement upwardly toward the main rail 12.

By the foregoing, variable height workstation in which the invention is embodied has been disclosed. However numerous modifications and substitutions may be made without deviating from the scope of the invention. For example, a BAND CYLINDER type actuator is disclosed as being employed in the variable height workstation of the present invention. However, this type actuator may be replaced by any number of duel action piston type actuators which may alternatively be fixedly supported below or above the gap 45 formed in the subsidiary loop 16. Also, various other types of escapement devices may be employed to accelerate trolleys onto the delivery apparatus 10 or onto the elevator 54 and are not limited to the type previously described. Therefore, the invention has been disclosed by way of illustration and not limitation.

We claim:

1. A delivery apparatus, positioned in a gap formed between adjoining rails, said apparatus comprising:
   a moveable rail section having opposite distal ends supported for movement between one position wherein said moveable rail section bridges a gap between opposed portions of said adjoining rails and another position remote from said one position wherein said moveable rail section is positioned generally adjacent a workstation;
   engagement means for automatically arresting travel of a trolley at a position on said moveable rail section between said distal ends as said moveable rail section moves from said one position toward said another position and for automatically accelerating said trolley off said rail section as said moveable rail section is moved into said one position bridging said gap between said opposed portions of said adjoining rails from said another position;

said engagement means being fixedly located adjacent said moveable rail section such that said engagement means and said moveable rail section move between said one position and said another position in unison with one another; and actuator means fixed to a support for carrying said moveable rail section and said engagement means with one another between said one position and said another position.

2. A trolley delivery apparatus as defined in claim 1 characterized by:

said actuator means further comprises a moveable slide connecting said moveable rail section and said engagement means with one another;

said slide having a given length with said length being sized to cooperate with stop means located between an uppermost and a selectedly adjustable lowermost position; and said moveable rail section and said engagement means being fixed to said slide such that when the slide is moved to its uppermost position, said given length of said slide acts against said stop means to position the moveable rail section in alignment with said adjoining rails.

3. A trolley delivery apparatus as defined in claim 2 further characterized by:

said actuator means being a vertically oriented actuator capable of vertically moving said rail section and said engagement means between said one and said another position; and said stop means including an upper stop for contacting with and limiting the upward movement of said slide and a lower adjustable stop for limiting the downward movement of said moveable rail section.

4. A trolley delivery apparatus as defined in claim 3 further characterized by said engagement means comprising a rotatable cam biased in either rotational direction by an over-the-center mechanism having a lever moveable between a generally horizontal position where said cam is positioned in a flow-through orientation and a generally raised position where said cam is rotated to a blocking orientation;

said actuator being supported within an inlaid channel extending substantially vertically, said channel further supporting an upper and a lower abutment;

said lever cooperating with each of said abutments such that when said lever is in said generally horizontal position, said lower abutment urges said lever toward said generally raised position as the slide moves from said one position toward said another position; and wherein said upper abutment urges said lever toward said generally horizontal position from said raised position when said slide is moved from said another position toward said one position.

5. A trolley apparatus as defined in claim 1 further characterized by said actuator means being a vertically oriented actuator having an elongate housing defined by opposite distal ends;

said elongate housing enclosing a sliding piston capable of moving said engagement means and said moveable rail section vertically between said one and said another positions;

an upper stop and an adjustable lower stop being positioned between the distal ends of said actuator;

said actuator means including a slide coupled to said sliding piston and moveable between said one position and said another position with said moveable rail and said engagement means being fixed to said slide; and wherein said slide has a given length defined by an upper and a lower end such that when the upper end of said slide contacts and abuts with said upper stop to limit the upper movement of the slide in an upward direction, the moveable rail section bridges said gap formed between said adjoining rail segments.

6. Trolley delivery apparatus as defined in claim 5 in further characterized in that:

said actuator means is fixedly supported to said support having a confronting surface juxtaposed to said vertically oriented actuator;

said actuator means being fixed in a spatial relationship with said support confronting surface; and said lower stop being carried by a stop cradle having a vertically extending portion interposed between said support confronting surface and said actuator means.

7. A trolley delivery apparatus as defined in claim 6 further characterized by said vertically extending portion of said cradle having a generally U-shape defined by two vertically extending sidewalls and an upstanding rear wall; and said rear wall of said cradle carrying adjustment means cooperating with said support confronting surface to vary position of the lower stop relative to the support.

8. A trolley delivery apparatus as defined in claim 7 further characterized by:

said support including a vertically oriented generally elongate through slot formed in said support and cooperating with said adjustment means carried by said cradle; and said adjustment means further including at least one threaded shank communicating through said slot formed in said support and including at least one lock nut rotatably secured to a portion of said at least one threaded shank which communicates through said slot such that the cooperation of said at least one threaded shank and said at least one lock nut draws the said cradle into engagement with the support confronting surface.

9. A trolley delivery apparatus as defined in claim 7, further characterized by said cradle including a horizontally extending portion bridging said two spaced apart sidewalls of said vertically extending portion;

said lower stop having a generally cylindrical shape and being externally threaded;

said horizontally extending portion having a through threaded opening for threadably receiving said lower stop therein; and said horizontally disposed portion of said cradle being spaced from and extending generally parallel with said upstanding rear wall of said vertically extending portion of said cradle such as to enclose said vertically oriented actuator along a portion of its length.

10. A trolley delivery apparatus as defined in claim 1 further characterized by said engagement means including a pivotal cam member having a stop face and a pusher portion rotatable between a flow-through position and a blocking position: and
>said engagement means further including a lever extending radially outwardly of said pivotal cam and being rotatably coupled therewith.

11. A trolley delivery apparatus as defined in claim 10 further characterized in that said moveable rail section and said escapement means are fixed to said actuator means by a generally L-shaped bracket;
>said generally L-shaped bracket having a first generally vertical portion and a second lower portion extending generally laterally of said first portion;
>said actuator means further including a slide moveable between said one position and said another position; and
>wherein said first generally vertical portion of said generally L-shaped bracket carries said pivotal cam and is fixed to said slide.

12. A trolley delivery apparatus as defined in claim 11 further characterized by said lever and said pivotal cam being rotatably mounted on a hat-shaped bracket formed on a portion of said first vertically extending portion of said generally L-shaped bracket; and
>wherein said hat-shaped bracket supports an outwardly extending pivot pin about which each of said lever and said cam rotate.

13. A trolley delivery apparatus as defined in claim 12 further characterized by said lever being a portion of a Z-shaped bracket;
>said Z-shaped bracket further having a mounting element extending generally parallel with said lever; and
>wherein said Z-shaped bracket further includes a transversely extending portion connecting said lever with said mounting element.

14. A trolley delivery apparatus as defined in claim 13 further characterized by said Z-shaped bracket and said pivotal cam being rotatably coupled with one another by a coupling pin;
>said mounting element of Z-shaped bracket and said pivotal cam having differently sized openings coaxially aligned with one another;
>said coupling pin having a stepped diameter intermediate an inner projecting end and an outer annularly grooved end such that said inner projecting end is received within said opening in said Z-shaped bracket and said outer grooved end is received within said opening in said pivotal cam; and
>wherein said intermediate stepped diameter portion cooperates with a retaining ring received within said grooved outer end of said coupling pin such that said stepped portion contacts with said mounting element of said Z-shaped bracket and said retaining ring cooperates with a portion of said pivotal cam to axially retain said coupling pin therewith.

15. A trolley delivery apparatus as defined in claim 14 further characterized in that said hat-shaped bracket further includes a spring support arm extending generally inwardly toward the base of said hat-shape;
>a spring being connected at one of its ends to said spring support arm and being connected at its other opposite end to said transversely extending portion of said Z-shaped bracket;
>said mounting element of Z-shaped bracket and said pivot pin each having a through aligned bore rotatably receiving said pivot pin therein; and
>wherein said spring is elongated at a maximum length in a plane containing the point of fixture between said one end of said spring and the spring support arm.

16. A trolley delivery apparatus as defined in claim 15 further characterized in that said hat-shaped bracket includes a cut-out cooperating with said coupling pin to limit upper rotational movement of said lever at a raised position:
>said support further having an upper and a lower abutment vertically spaced from one another and being fixed thereon;
>said actuator means further including a vertically oriented actuator and being spaced laterally from said upper and lower abutments on said support; and
>wherein said lower abutment cooperates with said lever to limit movement of said lever in a downward direction to position said lever generally horizontally.

17. A trolley delivery apparatus as defined in claim 16 wherein said upper abutment extends towards said actuator at a distance greater than said lower abutment:
>said lower abutment extends toward said actuator from said support beyond the end of said lever when said lever is in oriented generally horizontally coinciding with said moveable rail section being in said bridging position;
>said lower abutment extending toward said actuator at a distance less than the lateral extent of said lever when said lever is in said raised position such that when said moveable rail section is moved downwardly said lever engages said lower abutment and is urged upwardly toward said raised position thereby clearing said lower abutment; and
>wherein said lever in said raised position stands above said pivot pin a distance greater than the distance in which the upper abutment is oriented above said pivot pin when said moveable rail section is in said bridging position such that said lever is moved into engagement with the upper abutment prior to said rail section bridging said gap.

18. A trolley delivery apparatus as defined in claim 13 further characterized by said moveable rail section including guide means for securing the positioning moveable rail section in said bridging position relative to said adjoining rails: and
>wherein said moveable rail section further includes a one way turnstile for preventing inadvertent movement of a trolley back upstream of said engagement means.

19. A system for managing trolleys along a subsidiary loop between an upper main rail and a lowermost subsidiary loop point, said system comprising:
>an upstream rail portion and a downstream rail portion of said subsidiary loop;
>said upstream and said downstream rail portions defining a gap in said subsidiary loop such that the upstream and the downstream rail portions in the area adjacent said gap are each oriented at identical angles of inclination so as to be generally in alignment with one another;
>a trolley delivery apparatus located adjacent said gap:
>a first escapement device located adjacent said upstream rail portion, said first escapement device allowing trolleys initially diverted from said main rail to collect upstream of said trolley delivery apparatus and to be individually advanced at selected instances onto said trolley delivery apparatus;

said trolley delivery apparatus including a moveable rail section positioned within said gap and being moveable to a diverted position generally adjacent a workstation, engagement means moveable with said moveable rail section for arresting travel of a trolley on said moveable rail section when said rail section is lowered from a bridging position in said ga and for accelerating said trolley off of said moveable rail section when said moveable rail section is raised to said bridging position in said gap, actuator means positioned generally adjacent said gap and coupled to said moveable rail section and to said engagement means for moving said moveable rail section and said engagement means vertically through predetermined amounts between said bridging position and said position adjacent said workstation, said moveable rail section being oriented on said actuator mean relative to said upstream and said downstream rail portions at an inclination substantially equal to that of said upstream and downstream rail portions; and a second escapement device positioned adjacent said lowermost point of said downstream rail portion for advancing trolleys collecting downstream of said movable rail section onto an elevator car for carriage upwardly toward said main rail.

20. A conveyorized transport system as defined in claim 19 further characterized by said actuator means being fixed within an inlaid generally U-shaped channel and:

said actuator means including a hand cylinder type actuator affixed within said generally U-shaped channel.

21. A conveyorized transport system as defined in claim 19 wherein said first escapement device is adjustably positionable along said upstream portion of said subsidiary loop adjacent said trolley delivery apparatus.

22. An automated transport system as defined in claim 19 further characterized by said engagement means including a rotatable cam having a stop face and a pusher portion automatically rotatable between a flow-through position and a blocking position such that when said moveable rail section is moved to said bridging position said cam is rotated to said flow-through position and when said moveable rail section is moved from it bridging position toward said position adjacent said workstation rotating said cam is rotated to said blocking position.

23. An automated transport system as defined in claim 22 further characterized by said pivotal ca being urged between said flow-through position and said blocking position by an over-the-center spring mechanism cooperating with an upper and a lower abutment fixed to said generally U-shaped channel.

* * * * *